(12) United States Patent
Rayner

(10) Patent No.: US 6,321,692 B1
(45) Date of Patent: Nov. 27, 2001

(54) FUEL TREATMENT DISPENSER

(76) Inventor: Bradford William Rayner, 2073 Van Horne Drive, Kamloops, BC (CA), VIS IG5

( * ) Notice: Subject to any disclaimer, the term of this patent is extended or adjusted under 35 U.S.C. 154(b) by 0 days.

(21) Appl. No.: 09/576,352

(22) Filed: May 22, 2000

(51) Int. Cl.[7] .................................................. F02B 75/12
(52) U.S. Cl. ...................................... 123/1 A; 123/198 A
(58) Field of Search ................................ 123/198 A, 1 A

(56) References Cited

U.S. PATENT DOCUMENTS

| | | | |
|---|---|---|---|
| 3,620,424 | 11/1971 | Grigsby | 222/450 |
| 4,161,160 | 7/1979 | Hicks et al. | 123/1 A |
| 4,621,593 | 11/1986 | Rao et al. | 123/1 A |
| 5,421,295 | 6/1995 | Lemaire et al. | 123/179.7 |

*Primary Examiner*—Tony M. Argenbright
*Assistant Examiner*—Katrina B. Harris
(74) *Attorney, Agent, or Firm*—Patent & Trademark Services; Thomas Zack; Joseph H. McGlynn

(57) ABSTRACT

A fuel additive delivery system used with the fuel system of an engine. When fuel is added to a holding tank fluid pressure is reduced at a Venturi guide. The Venturi guide is connected to an additive delivery system. When the static fluid pressure in the Venturi guide falls below a level a sucking action is initiated. This action opens a normally closed valve in a meter system connected to an additive tank. When the valve opens additive flows from the additive tank into and past the Venturi guide into a fuel holding tank for the engine.

4 Claims, 2 Drawing Sheets

FUEL TREATMENT DISPENSER

BACKGROUND OF THE INVENTION

This invention relates to a fuel additive dispenser for use with the fuel delivery system of an engine.

Reducing fuel consumption is an important factor in many commercial ventures, such as in the commercial truck market and the operation of a combustion engine powered machinery. One method of doing so is to add a fuel agent, fuel treatment, fuel additive or fuel conditioner to the main fuel supply source for the engine. Adding such liquids to an existing main fuel source of combustible liquids can be done in a variety of ways. Whatever, the apparatus or method used it is very desirable that the resulting mixture be uniformly mixed, have the additive properly measured and be nonelectrically operated to avoid any possible safety consequences when used with combustible or burnable fuels.

Different types of methods and inventions have been employed to dispense a given amount of an additive into a fuel reservoir. Manually, one may simply discharge the contents of a container into the existing fuel inlet for the fuel tank. Another method of dispensing a metered quantity of fuel stores the fluid under pressure in a container normally open to a metering chamber. Valve means are located between the storage container and a measuring chamber and an associated discharge outlet provides for the positive ejection of the fluid. An additive injection system for diesel engines uses a fuel pump to supply fuel to the engine with a fuel tank to supply fuel to the pump and to a fuel additive tank.

Another prior art fuel additive delivery system uses a fuel additive reservoir with an electrically operated pump for positively displacing a measured amount of the additive to the fuel supply. A register means may be employed to register the amount of fuel replenished to the engine fuel supply and to transmit an electrical signal proportional to the amount of the fuel added. This electrical signal is used to permit the electrical operation of a pulse pump to dispense a required amount of the additive or agent to insure a uniform concentration of the agent throughout the fuel supply. Still another delivery system uses an additive tank with an on-board computation unit to determine the quantity of additive to be delivered. Using piston pulsed atomization, the additive is delivered to the fuel tank by the number of piston strokes.

DESCRIPTION OF THE PRIOR ART

Delivery systems that add an agent or additive to a fuel system are known. For example, in the U.S. Pat. No. 3,620,424 to Grigsby a metered quantity of fuel is stored in a fluid under pressure in a container normally open to a metering chamber. Valve means are located between the storage container and a measuring chamber and an associated discharge outlet provides for the positive ejection of the fluid.

U.S. Pat. No. 4,161,160 to Hicks et al. uses an additive injection system for diesel engines with a fuel pump to supply fuel to the engine and a fuel tank to supply fuel to the pump and to a fuel additive tank.

U.S. Pat. No. 4,621,593 to Rao et al. discloses a fuel additive delivery system that uses a fuel additive reservoir with an electrically operated pump for positively displacing a measured amount of the additive to the fuel supply. A register means may be employed to register the amount of fuel replenished to the engine fuel supply and to transmit an electrical signal proportional to the amount of the fuel added. This electrical signal is used permit the electrical operation of a pulse pump to dispense a required amount of the additive or agent to insure a uniform concentration of the agent throughout the fuel supply.

U.S. Pat. No. 5,421,295 to Lemaire et al. discloses a delivery system that uses an additive tank with an on-board computation unit to determine the quantity of additive to be delivered. Using piston pulsed atomization, the additive is delivered to the fuel tank by the number of piston strokes.

In the present invention is a fuel additive system that is nonelectrically operated to homogeneously add an additive to an existing fuel system and which can be retrofitted on the fuel tank opening all as will be detailed in the specification that follows hereafter.

SUMMARY OF THE INVENTION

This invention relates to a fuel additive system used to add fuel to an existing fuel system of an engine.

It is the primary object of the present invention to provide for the improved fuel additive system.

Another object is to provide for such a system using a pressure reduction housing before the fuel reservoir that has a feed line from the additive reservoir with an additive metering device interposed before the fuel reservoir.

These and other objects and advantages of the present invention will become apparent to readers from a consideration of the ensuing description and the accompanying drawings.

DESCRIPTION OF THE PREFERRED EMBODIMENT

Figure 1:
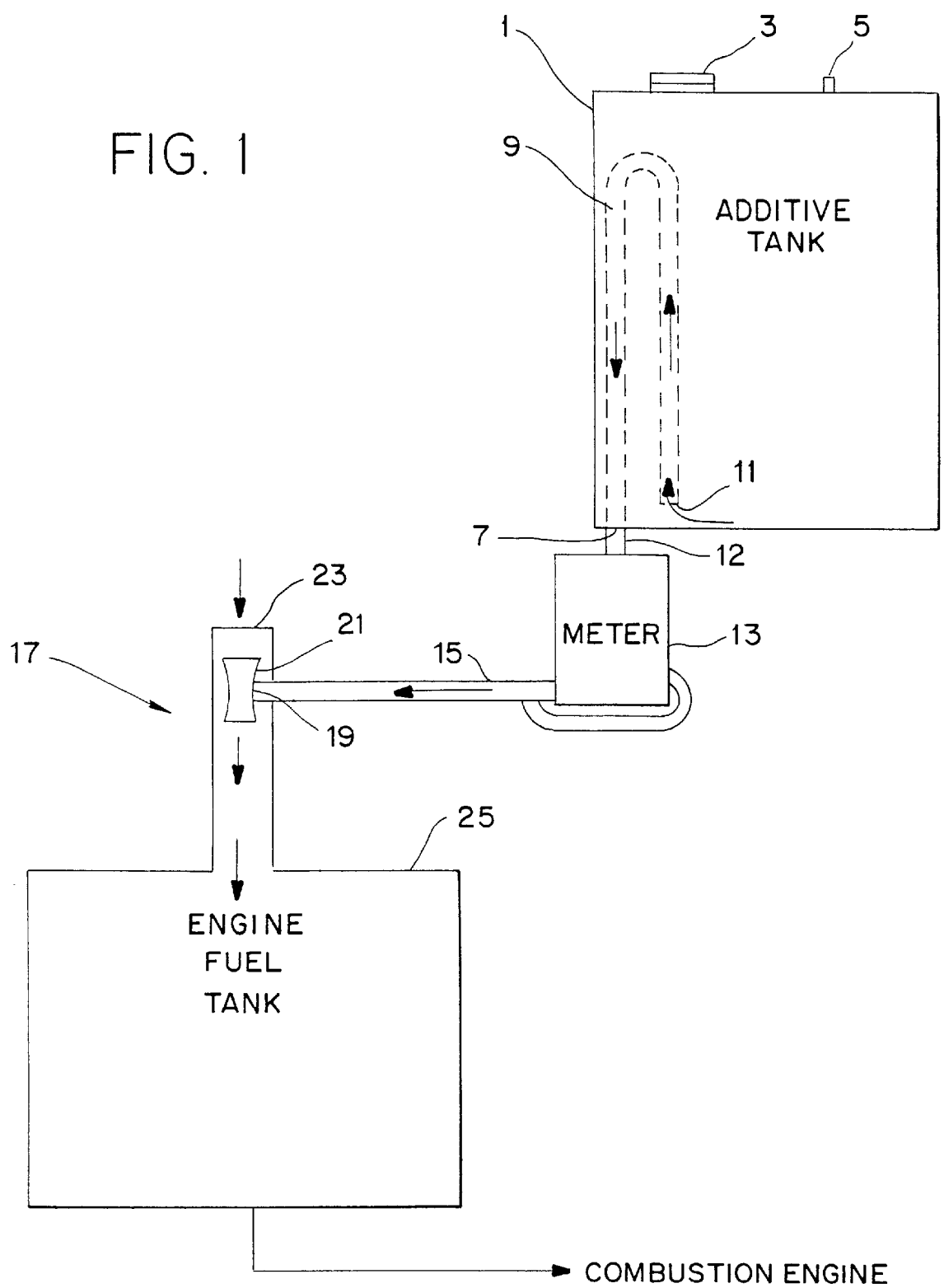
FIG. 1 is a schematic diagram showing the major interrelated system components used in the present invention.

FIG. 1 is a schematic diagram showing the major interrelated system components used in the present invention. It should be clear that the term "additive" or fuel additive as used in this specification includes the terms fuel agent, fuel conditioner and other types of fluids that are added to a fuel to enhance the operating characteristics of that fuel. More specifically some additives are added to a fuel supply used to provide for the increase in operating power for an engine like an internal or external combustion engine used in a vehicle or machine. Such additives are initially placed in the generally closed additive tank 1 through the capped filler opening 3. The tank 1 may be constructed of transparent material with appropriate volume indicating indicia to allow an observer to view the tank's contents and to have an indication of the amount of unused additive remaining in the tank.

Extending into the tank 1 is a rollover approved vent 5 near the capped filler opening 3. A lower tank discharge opening 7 allows a seamless tubing member 9 with an opened end 11, shown in dotted line format, to be inserted into the tank and to allow for the discharge of the fluid additive from the tank. After a volume of the additive is discharged from the tank, it flows via a short tube 12 into a fluid flow meter 13. The fluid flow meter 13 is used to regulate the amount of additive being added to the existing fuel system to achieve a uniform ratio of the additive to the fuel in the system.

Figure 3:
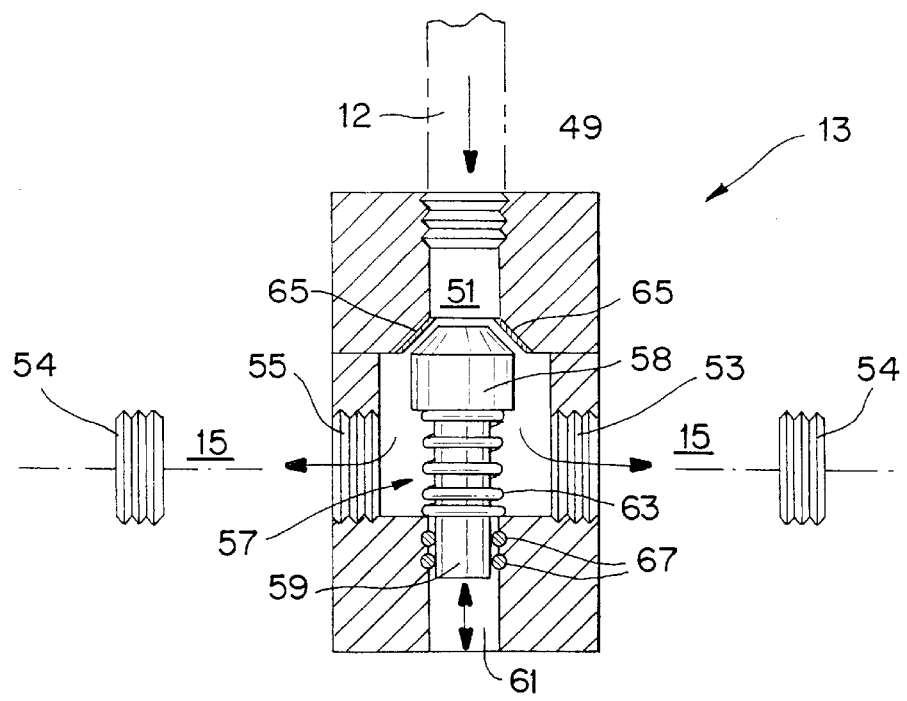
FIG. 3 is a cross sectional view of the metering device used in the present invention.

FIG. 3 shows the internal working of the metering device 13. A tubular additive inlet #4 braided conduit line 15, is mounted in and extends into the conventional existing fuel input system 17. As shown by the dotted lines 19, the opened output end of additive conduit line 15 allows the discharge of the additive fluid into an internal venturi guide 21 mounted below the fuel inlet opening 23 and above the engine fuel tank 25. The venturi guide 21 is mounted within the existing conventional fuel filler neck tube 27 connecting the inlet 23 to the fuel tank 25. The purpose of the venturi guide is to reduce the fluid pressure on the fluid additive being supplied at its location. It is important to note that the additive tank 1 is above the engine fuel tank 25 as this positioning is necessary for the additive to flow into and mix with the engine fuel, like gasoline or diesel fuel, and then flow to the conventional existing tank 25. The arrows show the direction of travel of the additive from the additive tank 1 through the conduit 15 into the venturi guide 21 and then into the engine fuel tank 25. The mixing of the additive to the engine fuel take place at or near the venturi guide 21 location when the additive flows to mix with the engine fuel being inserted through inlet 23 at the same time. After both the additive and engine fuel are mixed, the resultant fuel mixture is available in the fuel holding tank 25 for transport to an engine, such as the internal combustion of a vehicle.

Figure 2:
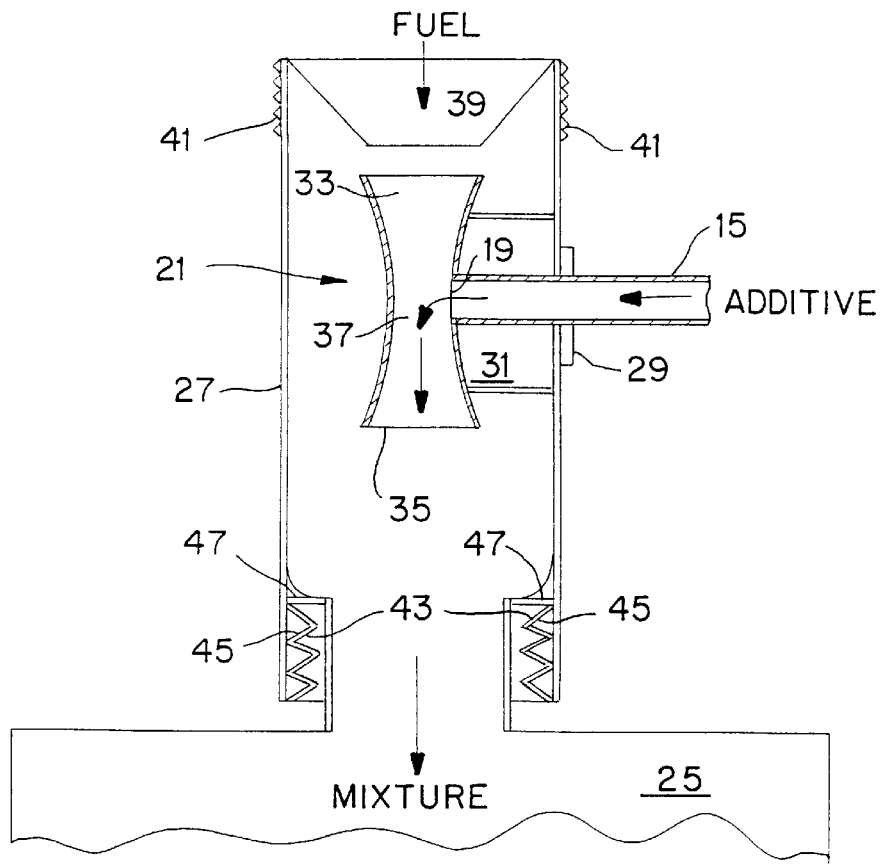
FIG. 2 is a side cross sectional view at the discharge additive end mounted within the filler neck tube of the engine fuel tank.

FIG. 2 is a side cross sectional view at the discharge additive end mounted within the filler neck tube 27 of the engine fuel tank 25. A SAE #4 fitting 29 provides a fluid tight seal to mount the fluid conduit 15 to the tube 27. The opened end of the conduit 15 extends through the side wall of tube 27 and into the tube's hollow interior where its opened output end 19 terminates within the hollow confines of venturi guide 21. A support bracket 31 fixed to both the interior wall of tube 27 and the guide 21 retains the guide within the hollow interior of tube 27. Normally, the center longitudinal axis of guide 21 is located at or near the center of the longitudinal axis of the elongated tube 27. Venturi guide tube 21 is shaped like a hollow hour glass tube having an upper entrance opening 33 and an opposite lower exit opening 35 of approximately the same opening size or diameter. Between the two openings along the length of tube 21 is a center restricted diameter flow portion 37. The portion 37 is considerably narrower in size or diameter than the diameters of either of the two openings 33 and 35 such that fluids flowing through portion 27 will increase in velocity at portion 37 and have a decrease in static fluid pressure. Connected at this reduced diameter portion 37 is the output opening 19 from additive conduit tube 15. The result is that this additive fluid from tube 15 and its connected tank 1 in fluid communication will experience a suction action to cause the additive to flow in the direction of the arrows towards the fuel tank 25.

Above the pressure reduction guide 21 is the conventional truncated nozzle stop 39 into which the opened end of a pump nozzle is inserted to deposit fuel in the tank 25. Also shown are conventional threads 41 on the upper inlet end of tube 27 for receiving a threaded fuel cap (not shown). Meshing threads 43 and 45 are also visible on the lower end of tube 27 to retain the tube to the opened neck end of the tank 25, which tank is partially shown. A ring seal 47 may also be used to provide for a fluid tight seal between the tank's neck and the tube 27. Other types of conventional fuel tank arrangements with different types of fuel cap retainers can, of course, be used with this invention. In any event, the conventional nozzle stop 39 has its lower exit opening just above and aligned at its center with the center of he venturi guide 21 forming part of the present invention. The fuel flowing through and from the nozzle stop 39 will as a consequence flow directly into the hollow center guide 21 positioned directly below the stop. As the liquid fuel flows into the guide 21 it will mix with the liquid additive supplied via conduit tube 15 and the resultant liquid mixture of additive and fuel will then be deposited in the lower tank 25 positioned below.

FIG. 3 is a cross sectional view of the metering device 13 used in the present invention. A small length of hollow tubing 12, shown in dotted line format, connects the meter input threaded input opening 49 to the additive tank 1 depicted in FIG. 1. Within the confines of the meter is a cross shaped chamber 51 composed of two mutually perpendicular legs. Two opposite side chamber bore legs 53 and 55 have interior threaded surfaces to permit meshing threaded ends from two conduits both of whose ends are connected to the common conduit tube 15 (not shown in this figure, see FIG. 1). Within the confines of chamber is a movable poppet valve 57. Valve 57 has an enlarged upper head 58 and a smaller diameter stem portion 59 connected to the head that extends into the lower chamber bore opening 61. The upper head 58 diameter is sized such that it cannot pass through the smaller diameter opening 61. Extending around the stem 59 between the head 58 and the surfaces of chamber openings 53 and 55 surrounding the opening 61, is a valve biasing coil spring 63. At the upper side surfaces of valve head 58 are appropriate seals 65 to prevent the passage of fluids from upper chamber 51 into the three chambers below when the valve head 58 engages the complementarily shaped sides of chamber 51. Additional lower stem ring shaped seals 67 fit in grooves on the stem 59 to provide for a lower fluid tight seal to the stem as it moves within the confines of chamber 61. When the input of fuel creates a low pressure area at opened nozzle side of tube 15 in the fuel filler neck 17, this low pressure in tube 15 is sufficient to unseat the poppet valve 57 from its shown seated position allowing the fluid in the additive reservoir to flow and mix with the fuel stream as previously described. In one example, about 1–5 ounces (U.S.) of additive were mixed with each 10 gallons (U.S.) of fuel. The once unseated poppet valve 57 will move back to a seated position due to the spring pressure via valve biasing coil spring 63. The valve remains opened only as long as low pressure is maintained in the guide 21. Once the amount of fuel inputted is stopped, the poppet valve automatically operates to a closed position via the spring pressure. A flow restrictive orifice fitting 54 with outer threads and an inner center hole is manually inserted in the chamber openings 53 and 55. This orifice fitting determines correct metering of additive that would be proportion to the fuel. The valve 57 remains unseated until the flow of fuel stops. After the fuel flow stops, the inherent strength of the poppet coil spring 63 is sufficient to cause the valve to reseat itself as shown in FIG. 3. The biasing strength of the spring 63 is predetermined and is sufficient to maintain the seated valve as shown until the low pressure is generated by the incoming flowing fuel in the venturi pressure reducing member 21. This spring valve strength is initially determined by the height and quantity of additive held in the additive tank 1. For additives specifically designed to reduce fuel consumption, the present invention contemplates the resultant fuel/additive mixture will cause fuel reductions in the range of 15 to 25 percent. Other fuel enhancing additives mixed with the fuel for other purposes will likewise have beneficial results depending on the specific chemical characteristics of the particular additive and fuel with which mixed. Clearly, it is contemplated that the additive delivery system of the present invention can be retrofitted on a great variety of existing conventional fuel delivery systems, such as those on vehicles and other fuel operated machinery, to automatically dispense a given amount of the additive into the fuel.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A fuel additive system used in conjunction with a fuel delivery system for an engine comprising:

a fuel delivery system having a fuel input conduit in fluid communication with a fuel holding tank, said holding tank being adapted to supply fuel to an engine, a fuel additive tank having an additive conduit joined to the fuel input conduit to provide for fluid communication with the fuel holding tank, said additive conduit having an opened end terminating within the fuel input conduit, fluid pressure reduction means within said fuel input conduit to reduce the amount of fluid pressure on the additive at the opened end of the additive conduit to allow for additive in the fuel additive tank to move towards the fuel input conduit and fuel holding tank, said fluid pressure reduction means consisting of a reduced sized opening volume between two larger sized openings, said fluid pressure reduction means being positioned in the flow path of the fuel deposited in the fuel input conduit before the fuel is deposited in the fuel holding tank, an additive meter in fluid communication with said additive conduit and interposed between the fuel input conduit and the fuel additive tank for metering the amount of additive being supplied to a volume of fuel deposited in the holding tank, and said additive meter including a valve normally biased to a closed position by a biasing member to prevent the flow of additive to the fuel input conduit, said valve being responsive to suction action based on the fluid pressure at the fluid reduction means to open and remain opened when the static fluid pressure at the reduced sized opening volume is below a level, said valve being closed by the biasing member when the static fluid pressure increases above this level.

2. The combination as claimed in claim 1, wherein fuel additive tank is above the holding tank.

3. The combination as claimed in claim 1, wherein fluid pressure reduction means is opened and hour glass shaped with the a narrow center portion, said narrow center portion being adapted to receive the opened end of the additive conduit.

4. The combination as claimed in claim 3, also including a mounting bracket within the fuel input conduit to retain the fluid pressure reduction means at approximately the center of the fuel input conduit.

* * * * *